(12) United States Patent
Sakurada et al.

(10) Patent No.: US 11,367,107 B2
(45) Date of Patent: Jun. 21, 2022

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventors: Shin Sakurada, Toyota (JP); Yuko Mizuno, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/571,861

(22) Filed: Sep. 16, 2019

(65) Prior Publication Data
US 2020/0098007 A1 Mar. 26, 2020

(30) Foreign Application Priority Data

Sep. 21, 2018 (JP) .............................. JP2018-177955

(51) Int. Cl.
*G06Q 30/02* (2012.01)
*H04W 4/029* (2018.01)

(52) U.S. Cl.
CPC ........ *G06Q 30/0265* (2013.01); *H04W 4/029* (2018.02)

(58) Field of Classification Search
CPC ..... H04W 4/029; H04W 4/024; H04W 4/027; H04W 4/40; H04W 4/38; G06Q 30/02–0277
See application file for complete search history.

(56) References Cited

U.S. PATENT DOCUMENTS

2008/0077955 A1* 3/2008 Haberman ......... H04N 7/17318
725/35
2008/0134955 A1 6/2008 Morrow
(Continued)

FOREIGN PATENT DOCUMENTS

DE 102017218786 A1 4/2019
JP 2006-313317 A 11/2006
(Continued)

OTHER PUBLICATIONS

Clarke, David Langton "Errors in the perception of motion in depth: Effects of a structured field-of-view", North Carolina State University, ProQuest Dissertations Publishing, 1998. (Year: 1998).*
(Continued)

*Primary Examiner* — Raquel Alvarez
(74) *Attorney, Agent, or Firm* — Oliff PLC

(57) ABSTRACT

An information processing apparatus includes a control unit configured to execute the processing of obtaining location information of an advertisement displaying vehicle capable of displaying advertising information on a display apparatus arranged to face outside, finding a plurality of advertisement target vehicles present in the vicinity of the advertisement displaying vehicle based on the location information, obtaining attribute information indicating attributes of occupants of the plurality of advertisement target vehicles, selecting advertising information to be displayed by the display apparatus on the basis of the attribute information, and causing the display apparatus to display the selected advertising information.

5 Claims, 12 Drawing Sheets

(56) References Cited

U.S. PATENT DOCUMENTS

| | | |
|---|---|---|
| 2014/0040016 A1 | 2/2014 | Amla et al. |
| 2015/0220991 A1* | 8/2015 | Butts .................. G06Q 30/0265 |
| | | 705/14.62 |
| 2016/0317074 A1* | 11/2016 | Kawai .................... A61B 5/1118 |
| 2018/0231979 A1 | 8/2018 | Miller et al. |
| 2018/0232770 A1 | 8/2018 | Miller et al. |
| 2018/0357668 A1* | 12/2018 | Kanemoto ......... G06Q 30/0264 |
| 2019/0268743 A1* | 8/2019 | Cho ................. G08G 1/096791 |
| 2020/0074507 A1* | 3/2020 | Takemura .......... G06Q 30/0266 |
| 2020/0167825 A1* | 5/2020 | Otsuka .................. G06F 3/1454 |

FOREIGN PATENT DOCUMENTS

| | | |
|---|---|---|
| JP | 2010-237411 A | 10/2010 |
| JP | 2017-161600 A | 9/2017 |
| JP | 2018-526749 A | 9/2018 |
| JP | 2019125189 A | 7/2019 |
| WO | 2018038545 A1 | 3/2018 |

OTHER PUBLICATIONS

Jan. 1, 2021 Office Action issued in U.S. Appl. No. 16/571,307.
May 14, 2021 Office Action issued in U.S. Appl. No. 16/571,307.
Sep. 3, 2021 Office Action issued in U.S. Appl. No. 16/571,307.
Feb. 9, 2022 Notice of Allowance issued in U.S. Appl. No. 16/571,307.
Feb. 28, 2022 Corrected Notice of Allowability issued in U.S. Appl. No. 16/571,307.
Mar. 9, 2022 Corrected Notice of Allowability issued in U.S. Appl. No. 16/571,307.

* cited by examiner

INFORMATION PROCESSING APPARATUS AND INFORMATION PROCESSING METHOD

CROSS REFERENCE TO THE RELATED APPLICATION

This application claims the benefit of Japanese Patent Application No. 2018-177955, filed on Sep. 21, 2018, which is hereby incorporated by reference herein in its entirety.

BACKGROUND

Technical Field

The present disclosure relates to information processing for providing advertisements using vehicles as advertising media.

Description of the Related Art

Advertising using vehicles as media has been developed in recent years. For example, Japanese Patent Application Laid-Open No. 2010-237411 discloses an advertisement display apparatus provided on a bus on a regular route.

This prior art advertisement display apparatus is configured to take a picture of a vehicle running behind with its license plate to determine whether the vehicle behind is a rented car and whether the place of registration of it is the same as the bus. The advertisement display apparatus displays either an advertisement intended for visitors or an advertisement intended for local residents in accordance with the result of determination.

SUMMARY

To enhance the effectiveness of an advertisement displayed using a vehicle as a medium, it is desirable that an appropriate advertisement be displayed not only for a single vehicle running behind the vehicle that displays the advertisement but also for a plurality of vehicles that are present in the vicinity of the vehicle.

The present disclosure has been made in view of the above circumstances and an object of the present disclosure is to enhance the effectiveness of advertisements that are displayed using a vehicle as a medium.

An information processing apparatus according to a first aspect of the present disclosure comprises a control unit configured to execute the processing of:
  obtaining location information of an advertisement displaying vehicle capable of displaying advertising information on a display apparatus arranged to face outside;
  finding a plurality of advertisement target vehicles present in the vicinity of the advertisement displaying vehicle based on the location information;
  obtaining attribute information indicating attributes of occupants of the plurality of advertisement target vehicles;
  selecting advertising information to be displayed by the display apparatus on the basis of the attribute information; and
  causing the display apparatus to display the selected advertising information.

An information processing method according to a second aspect of the present disclosure comprises executing the following processing by an information processing apparatus:
  obtaining location information of an advertisement displaying vehicle capable of providing an advertisement through a display apparatus arranged to face outside;
  finding a plurality of advertisement target vehicles present in the vicinity of the advertisement displaying vehicle based on the location information;
  obtaining attribute information indicating attributes of occupants of the plurality of advertisement target vehicles;
  selecting an advertisement to be displayed by the display apparatus on the basis of the attribute information; and
  causing the display apparatus to display the selected advertising information.

According to a third aspect of the present disclosure, there is provided a program configured to cause a computer to implement the above-described information processing method or a computer-readable storage medium in which such a program is stored in a non-transitory manner.

The present disclosure can enhance the effectiveness of advertisement provided using a vehicle as a medium.

DESCRIPTION OF THE EMBODIMENTS

Figure 1:
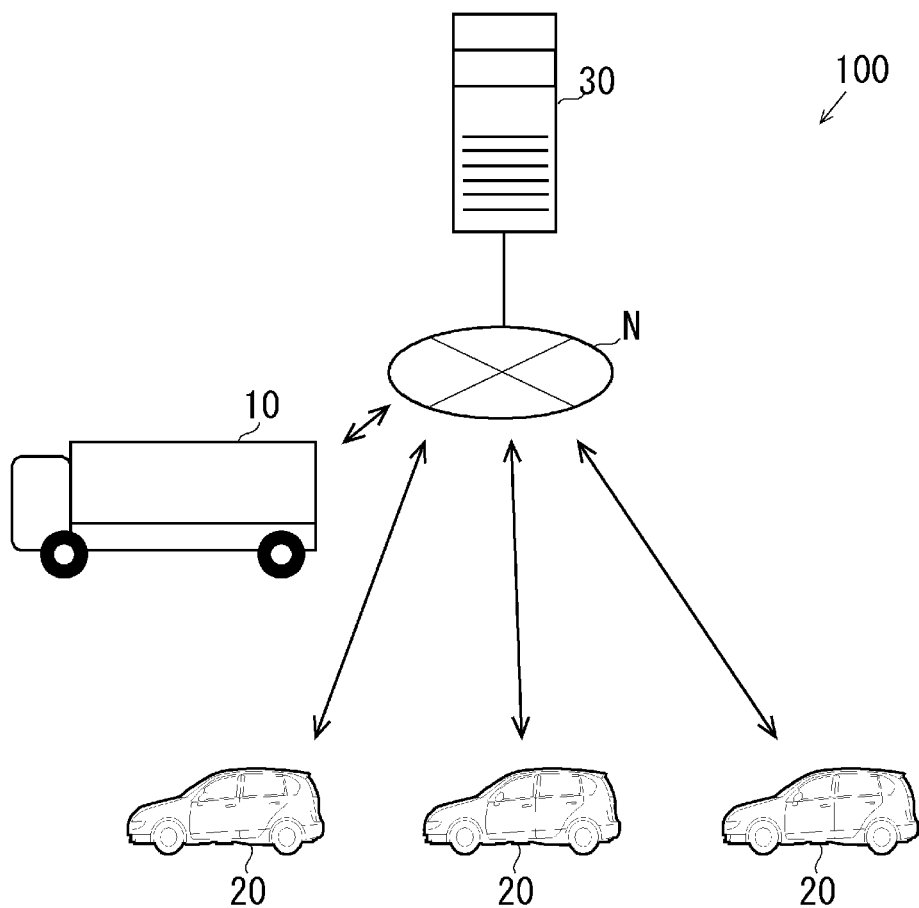
FIG. 1 is a diagram illustrating the configuration of an advertisement display system according to a first embodiment.

An advertisement display system according to an embodiment causes a vehicle to display an advertising information on an outwardly facing display apparatus provided on it to perform advertising to occupants of vehicles present in the vicinity of it. Such a vehicle that provides advertisements will be referred to as an advertisement displaying vehicle. When displaying advertising information in this way, if, for example, the advertisement display system obtains information from a specific vehicle running immediately behind the advertisement displaying vehicle and displays advertising information suitable for this specific vehicle, the advertising information thus displayed may have no relevancy to other vehicles that are running around the advertisement displaying vehicle, resulting in limited advertising effectiveness.

To remove such a limitation, the advertisement display system according to the embodiment includes an information processing apparatus that is configured to obtain attribute information of occupants of a plurality of vehicles present in the vicinity of the advertisement displaying vehicle, select an advertisement to be displayed by the display apparatus of the advertisement displaying vehicle based on the attribute information, and cause the display apparatus to display the selected advertisement. Thus, the information processing apparatus according to the embodiment can cause the advertisement displaying vehicle to display advertising information that interests occupants of many vehicles that are running around the advertisement displaying vehicle, thereby enhancing the advertising effective.

The advertisement displaying vehicle according to this embodiment is a vehicle provided with a display apparatus that serves as an advertising medium capable of displaying advertising information. In the following the term "advertisement target vehicles" will be used to refer to vehicles that are running around an advertisement displaying vehicle and occupied by occupants who can see an advertisement displayed by the advertisement displaying vehicle. There is no limitation on the types of advertisement displaying vehicles and advertisement-target vehicles, and they may be any type of transportation means, such as buses, trucks, taxis, passenger cars, or trolley cars. Examples of the advertisement displaying vehicles and advertisement target vehicles may include bicycles, motorcycles, and trolley cars.

In the description of this embodiment, the term "occupant" refers to any person that occupies a vehicle, who is not limited to a driver or crew. Examples of attribute information of an occupant include information about his/her age, gender, place of residence, family composition, occupation, hobby, purchase history, and advertisement category. The purchase history is a collection of information about products or services that the occupant purchased in the past. For example, when the occupant (or user) purchased a product in a store, an information processing apparatus provided in the store stores information about the purchased product, the date of purchase, and the price of the product with the user's ID associated therewith. The advertisement category information is information indicating categories of things advertised (namely, the subjects of advertising) in which the occupant is interested, such as electrical appliances, cars, movies, sports, and travel. Each occupant designates advertisement categories he/she wishes to be displayed in advance, and the advertisement display system stores information about the designated advertisement categories in a database.

Since the advertisement display system determines the advertising information to be displayed based on the attribute information of the occupants as above, it can display appropriate advertisements that interest the occupants.

When determining the advertising information to be displayed, the advertisement display system may further take account of the destination and the speed of each vehicle in addition to the attribute information of the occupants.

The advertising information displayed may be either a moving image or a still image. For example, the advertisement display system may obtain information about the state of travel of the advertisement displaying vehicle and the advertisement target vehicles and display advertising information in the form of a moving image when the vehicles are not running and advertising information in the form of a still image when the vehicles are running.

In the following, specific embodiments of the present disclosure will be described with reference to the accompanying drawings. It should be understood that the hardware configurations, the module configurations, and the functional configurations that will be described in connection with the embodiments are not intended to limit the technical scope of the present disclosure only to them, unless stated otherwise.

First Embodiment

FIG. 1 illustrates the configuration of an advertisement display system 100 according to a first embodiment. The advertisement display system 100 according to the first embodiment includes an advertisement displaying vehicle 10, a plurality of advertisement target vehicles 20, and a server apparatus 30.

The advertisement displaying vehicle 10 is an automobile having a plurality of display apparatuses provided on its outside and capable of displaying advertising information received from the server apparatus on one or some of the display apparatuses. The advertising information displayed may be either a still image or a moving image. While FIG. 1 illustrates only one advertisement displaying vehicle 10, the advertisement display system 100 may include any number of advertisement displaying vehicles 10.

The advertisement displaying vehicle 10 sends information relating to the state of display of advertisement to the server apparatus 30 periodically. The information relating to the state of display of advertisement includes, for example, location information and information identifying the advertisement on display.

The advertisement target vehicle 20 is a vehicle occupied by occupants who are a target audience of advertising by the advertisement displaying vehicle 10. When the advertisement target vehicle 20 is running around the advertisement displaying vehicle 10, the occupants of the advertisement target vehicle 20 can see the advertisement displayed by the advertisement displaying vehicle 10.

The server apparatus 30 manages advertising information displayed by the advertisement displaying vehicles 10. The server apparatus 30 has advertising information and data of the attribute information of the occupants of the advertisement target vehicles 20. The server apparatus 30 conducts determination of the advertisement to be displayed by the advertisement displaying vehicles 10, distribution of the advertisement, and management of the result of display of advertisements (e.g. making a report to the advertiser).

The server apparatus 30 manages the locations of the advertisement displaying vehicles 10 while they are travelling, records of travel of them, and identification data of advertisements displayed by the advertisement displaying vehicles 10.

The vehicles 10, 20 and the server apparatus 30 in the advertisement display system 100 according to the embodiment are connected by a communication line N. A public communication network, such as the Internet or other communication network may be used as the communication line N. The communication line N may include a telephone communication network, such as a cellular phone network and/or a wireless communication network using Wi-Fi (registered trademark) or Bluetooth (registered trademark).

Figure 2:
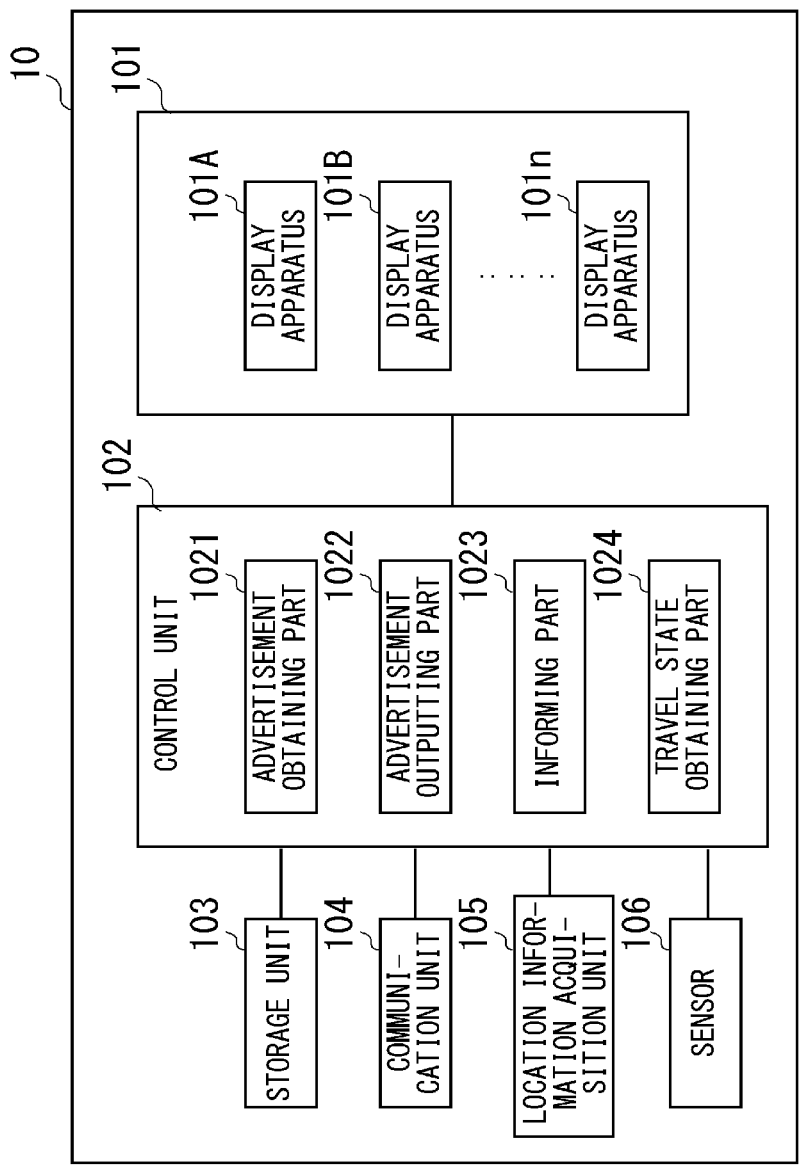
FIG. 2 is a diagram illustrating the system configuration of an advertisement displaying vehicle.
Figure 3:
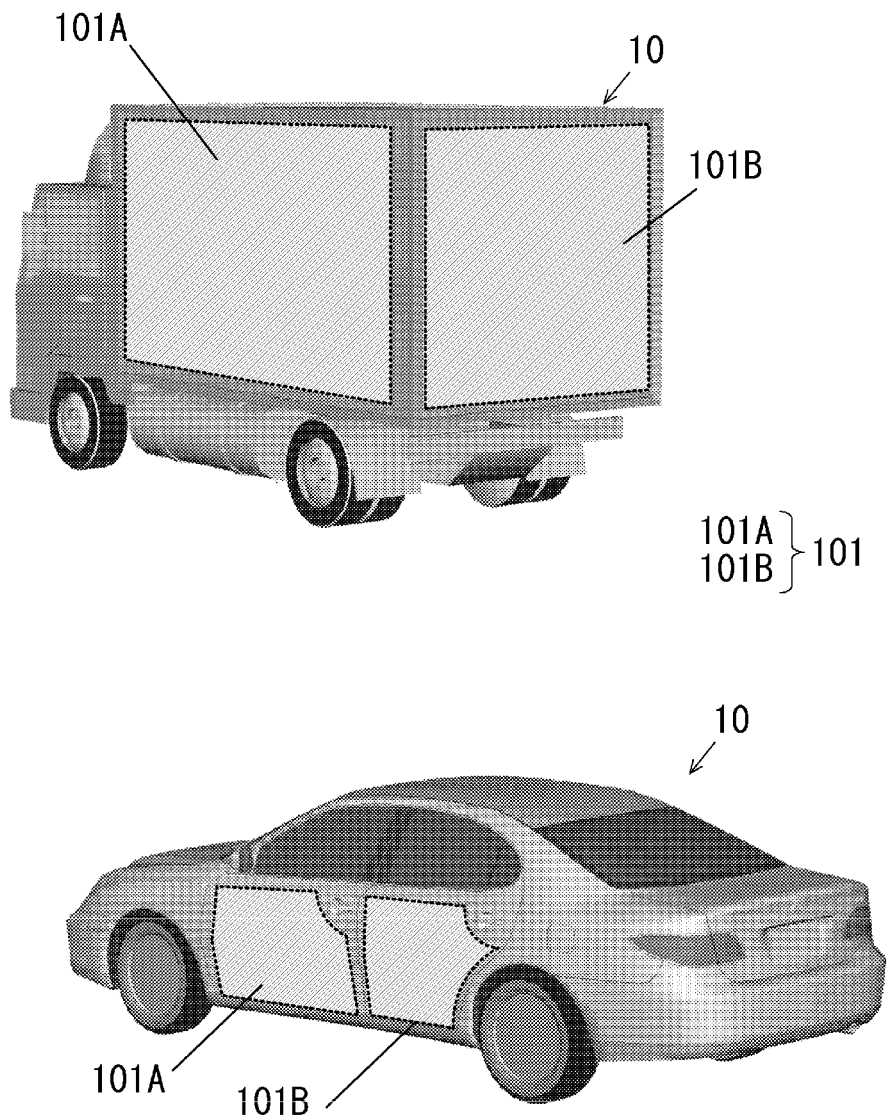
FIG. 3 illustrates the positions of display apparatuses provided on advertisement displaying vehicles.

Now, the configuration of the advertisement displaying vehicle 10 will be described. FIG. 2 is a diagram illustrating the system configuration of the advertisement displaying vehicle 10.

The advertisement displaying vehicle 10 has a display apparatus 101, a control unit 102, a storage unit 103, a communication unit 104, a location information acquisition unit 105, and a sensor 106.

The display apparatus 101 includes a plurality of display apparatuses provided on the outside of the advertisement displaying vehicle 10. The advertisement displaying vehicle 10 according to this embodiment has a plurality of display apparatuses (101A, 101B, . . . , 101n) that arranged to face outside the vehicle. The display apparatus will be collectively designated as the display apparatus 101, where identification of an individual display apparatus is not necessary. The number of display apparatuses provided on the advertisement displaying vehicle 10 may be one.

The display apparatus 101 may be a liquid crystal display, an organic electroluminescence display, an LED matrix, or a projector.

The number of display apparatuses 101 provided on the advertisement displaying vehicle 10 varies depending on the type or model of the advertisement displaying vehicle 10. Display apparatuses 101 may be provided on different portions of the advertisement displaying vehicle 10, for example, on the right and left sides, the rear, and the top of the vehicle. For example, if the advertisement displaying vehicle 10 is a truck, it may have display apparatuses 101 provided on the right side, the left side, and the rear of the vehicle. If the advertisement displaying vehicle 10 is a sedan, it may have display apparatuses 101 provided on the front door on the left side, the rear door on the left side, the front door on the right side, and the rear door on the right side. The advertisement displaying vehicle 10 may be provided with a base on its top, and a display apparatus 101 may be mounted on the base. The advertisement displaying vehicle 10 may have a display apparatus 101 that is provided in place of the rear window.

Display apparatuses 101 may be provided at positions other than those described above. For example, if the display apparatus 101 is configured to project an image onto a window pane, it may be arranged to project an advertising image on a side window or a rear window.

The control unit 102 is a computing device that controls the function of outputting advertisements among the functions of the vehicle 10. The control unit 102 may be implemented by a computational processing unit, such as a CPU (Central Processing Unit).

The control unit 102 includes, as functional modules, an advertisement obtaining part 1021, an advertisement outputting part 1022, an informing part 1023, and a travel state obtaining part 1024. These functional modules may be implemented by executing programs stored in the storage unit 103 (described later) by a CPU.

The advertisement obtaining part 1021 obtains data (advertisement data) relating to an advertisement to be output to the display apparatus 101 from the server apparatus 30. The advertisement obtaining part 1021 obtains advertisement data periodically or at a predetermined time while the advertisement displaying vehicle 10 is travelling. For example, the advertisement obtaining part 1021 may access the server apparatus 30 at regular intervals (e.g. one minute) to obtain advertisement data of an advertisement to be displayed next. The advertisement obtaining part 1021 may obtain advertisement data just before the advertisement displaying vehicle 10 starts to travel, at the time when the ignition is turned on, at the time when the destination is determined, or at the time when the advertisement displaying vehicle 10 starts to travel. The advertisement data obtained by the advertisement obtaining part 1021 is stored in the storage unit 103, which will be described later.

The advertisement outputting part 1022 outputs an image or the like contained in the advertisement data to the display apparatus 101. In the case where a condition for outputting the advertisement is specified in the advertisement data, the advertisement outputting part 1022 may output the advertisement only when the condition is met. In the case where the position and the size of the display apparatus is specified in the advertisement data, the advertisement outputting part may output the advertisement in accordance with the specifications. In the case where the advertisement data contains sound data, the advertisement outputting part 1022 may output voice or music through the speaker of the display apparatus 101.

The informing part 1023 sends information relating to display of an advertisement to the server apparatus 30. Specifically, the informing part 1023 collects information about the present location of the advertisement displaying vehicle 10, identification data of the advertisement presently displayed (advertisement ID), the number of advertisement target vehicles 20 present in the vicinity of the advertisement displaying vehicle 10 and other information relating to the advertisement and sends them to the server apparatus 20.

The storage unit 103 includes a main storage device and an auxiliary storage device. The main storage device is a memory into which programs executed by the control unit 102 and data used by such control programs are loaded. The auxiliary storage device is a device in which the programs executed by the control unit 102 and the data used by the control programs (including advertisement data) are stored. An operating system for executing the programs may also be stored in the auxiliary storage device. Programs stored in the auxiliary storage device are loaded into the main storage device and executed by the control unit 102 to implement the above-described functions.

The communication unit 104 is a wireless communication interface that connects the advertisement displaying vehicle 10 to the communication line N. The communication unit 104 provides access to the communication line N via, for example, a wireless LAN or a mobile communication service based on 3G or LTE.

The location information acquisition unit 105 is a unit configured to acquire location information of the advertisement displaying vehicle 10. The location information acquisition unit 105 includes a positioning device that utilizes, for example, the global positioning system (GPS) or the global navigation satellite system (GLONASS) to acquire positional information (e.g. latitude and longitude) of the advertisement displaying vehicle 10. The positioning device is not limited to one utilizing a satellite positioning system, but it may determine the location of the advertisement displaying vehicle 10 autonomously by sensing the direction and speed of travel of the vehicle using sensors, such as an acceleration sensor, a gyro sensor, a magnetic field sensor, and a vehicle speed sensor.

The sensor 106 refers to a group of sensors provided on the advertisement displaying vehicle 10. The sensor 106 includes one or more sensors that acquire a physical quantity relating to the speed or average speed as sensor data. The sensor data output from the sensor 106 is sent to the travel state obtaining part 1024. The sensor 106 is not necessarily one that directly senses a physical quantity. For example, the sensor 106 may obtain data relating to the degree of traffic congestion in the vicinity of the advertisement displaying vehicle 10, data relating to the speed of other vehicles around the advertisement displaying vehicle 10, and data relating to control of traffic signals that are obtained by road-to-vehicle communication and inter-vehicle communication. The sensor 106 may include an acceleration sensor and a magnetic field sensor provided on the vehicle, or the location information acquisition unit 105 may include such sensors.

The information collected by the travel state obtaining part 1024 is transmitted to the server device 30 via the informing part 1023.

The configuration in FIG. 2 is given as an illustrative example, and some or all of the functions illustrated in FIG. 2 may be implemented by application-specific circuits. Programs may be stored or executed using a main storage device and an auxiliary storage device other than those illustrated in FIG. 2.

Figure 4:
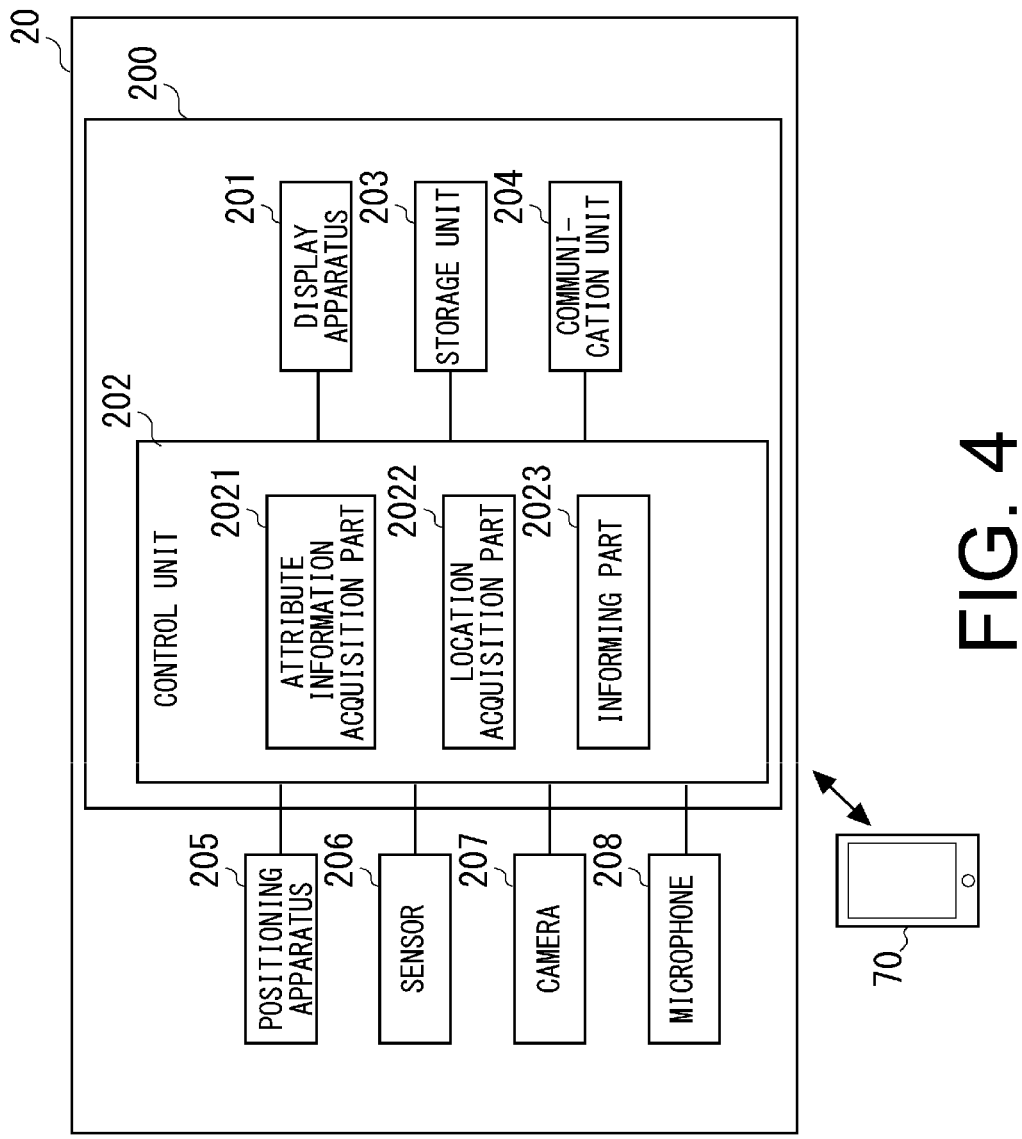
FIG. 4 is a diagram illustrating the configuration of an advertisement target vehicle.

Next, the configuration of the advertisement target vehicle 20 will be described. FIG. 4 is a diagram illustrating the configuration of the advertisement target vehicle 20.

The advertisement target vehicle 20 is provided with an on-vehicle apparatus 200, a positioning apparatus 205, a sensor 206, a camera 207, and a microphone 208.

The on-vehicle apparatus 200 is an information processing apparatus provided on the advertisement target vehicle 20. The on-vehicle apparatus 200 obtains attribute information of the occupants of the advertisement target vehicle 20 and sends the attribute information to the server apparatus 30. The on-vehicle apparatus 200 according to this embodiment determines the location of the vehicle 20 and sends the location information to the server apparatus 30. The on-vehicle apparatus 200 may be, for example, a navigation apparatus, an audio apparatus, or a drive recorder.

The on-vehicle apparatus 200 has a display unit 201, a control unit 202, a storage unit 203, and a communication unit 204.

The display unit 201 is provided, for example, at the center of the dashboard with respect to the width of the vehicle to display information such as a map and a route to a destination etc. for the user. The display unit 201 includes a touch panel superposed on the display area of it to allow user's inputs by touch operations.

The control unit 202 is a processing device that control acquisition and transmission of the attribute information of the occupants and the location information. The control unit 202 may be implemented by a computational processing unit such as a CPU (Central Processing Unit).

The control unit 202 includes, as functional modules, an attribute information acquisition part 2021, a location acquisition part 2022, and an informing part 2023. These functional modules may be implemented by executing programs stored in the storage unit 203 by a CPU.

The attribute information acquisition part 2021 acquires attribute information of the occupants of the advertisement target vehicle 20. The attribute information acquisition part 2021 acquires the attribute information by, for example, accessing occupant's terminals 70, such as smartphones that the occupants of the advertisement target vehicle 20 have. Furthermore, the attribute information acquisition part 2021 extracts face images of the occupants from an image of the interior of the vehicle captured by the camera 207 by pattern matching to determine the number of face images, namely the number of occupants. Moreover, the attribute information acquisition part 2021 determines the age and gender of the occupants by analyzing the face images. Furthermore, the attribute information acquisition part 2021 captures voices of the occupants through the microphone 208 and estimates the age and gender of them by comparing formants of their voices with known patterns. The attribute information acquisition part 2021 may determine the number of occupants from the result of sensing by seat sensors provided on the seats of the vehicle, specifically on the basis of the number of seat sensors that sense the seating pressure of the occupants.

The location acquisition part 2022 acquires location information of the advertisement target vehicle 20. For example, the location acquisition part 2022 acquires location information (e.g. latitude and longitude) by calculation based on signals received by the positioning apparatus 205 from a plurality of positioning satellites. Alternatively, the location acquisition part 2022 may be configured to receive a beacon signal indicating a location by road-to-vehicle communication or inter-vehicle communication and acquire location information of the advertisement target vehicle using the beacon signal. The location information is not limited to latitude and longitude, but it may be any information that indicates the location of the advertisement target vehicle 20. Examples of such location information include information identifying the road on which the vehicle is located (e.g. a link number) or information identifying the nearest intersection (e.g. a node number), in other words any information that enables determination of whether or not the advertisement target vehicle 20 is located in the vicinity of the advertisement displaying vehicle 10. The vicinity of the advertisement displaying vehicle 10 means, for example, an area in which the advertisement displayed by the advertisement displaying vehicle 10 can be seen.

The location acquisition part 2022 may receive a beacon signal from the advertisement displaying vehicle 10 periodically and use the beacon signal as the location information. When the location acquisition part 2022 receives a beacon signal from the advertisement displaying vehicle 10, the location acquisition part 2022 is located within the transmission range of the beacon signal, which means it is located in the vicinity of the advertisement displaying vehicle 10.

The informing part 2023 sends the attribute information of the occupants acquired by the attribute information acquisition part 2021 and the location information acquired by the location acquisition part 2022 to the server apparatus 30.

The storage unit 203 includes a main storage device and an auxiliary storage device. The main storage device is a memory into which programs executed by the control unit 202 and data used by such control programs are loaded. The auxiliary storage device is a device in which the programs executed by the control unit 202 and the data used by the control programs (including advertisement data) are stored. An operating system for executing the programs may also be stored in the auxiliary storage device. Programs stored in the auxiliary storage device are loaded into the main storage device and executed by the control unit 202 to implement the above-described functions.

The communication unit 204 is a wireless communication interface that connects the on-vehicle apparatus 200 to the communication line N. The communication unit 204 provides access to the communication line N via, for example, a wireless LAN or a mobile communication service based on 3G or LTE.

The positioning apparatus 205 is an apparatus configured to acquire location information of the advertisement target vehicle 20. The positioning apparatus 205 includes a positioning device that utilizes, for example, a global positioning system (GPS) or a global navigation satellite system (GLO- NASS) to acquire location information (e.g. latitude and longitude) of the advertisement target vehicle 20. The positioning device is not limited to one utilizing a satellite positioning system, but it may determine the location of the advertisement target vehicle 20 autonomously by sensing the direction and speed of travel of the vehicle using sensors, such as an acceleration sensor, a gyro sensor, a magnetic field sensor, and a vehicle speed sensor.

The sensor 206 refers to a group of sensors provided on the advertisement target vehicle 20. The sensor 206 includes one or more sensors that acquire a physical quantity relating to the advertisement target vehicle, such as a vehicle speed sensor, a distance sensor, a steering angle sensor, and a seat sensor.

The camera 207 is provided at an upper front position in the cabin of the advertisement target vehicle, The taking lens of the camera 207 is oriented rearward to capture images of the interior of the vehicle. The microphone 208 converts voices of the occupants into electrical signals, which are input to the control unit 202.

The configuration in FIG. 4 is given as an illustrative example, and some or all of the functions illustrated in FIG. 4 may be implemented by application-specific circuits. Programs may be stored or executed using a main storage device and an auxiliary storage device other than those illustrated in FIG. 4.

Figure 5:
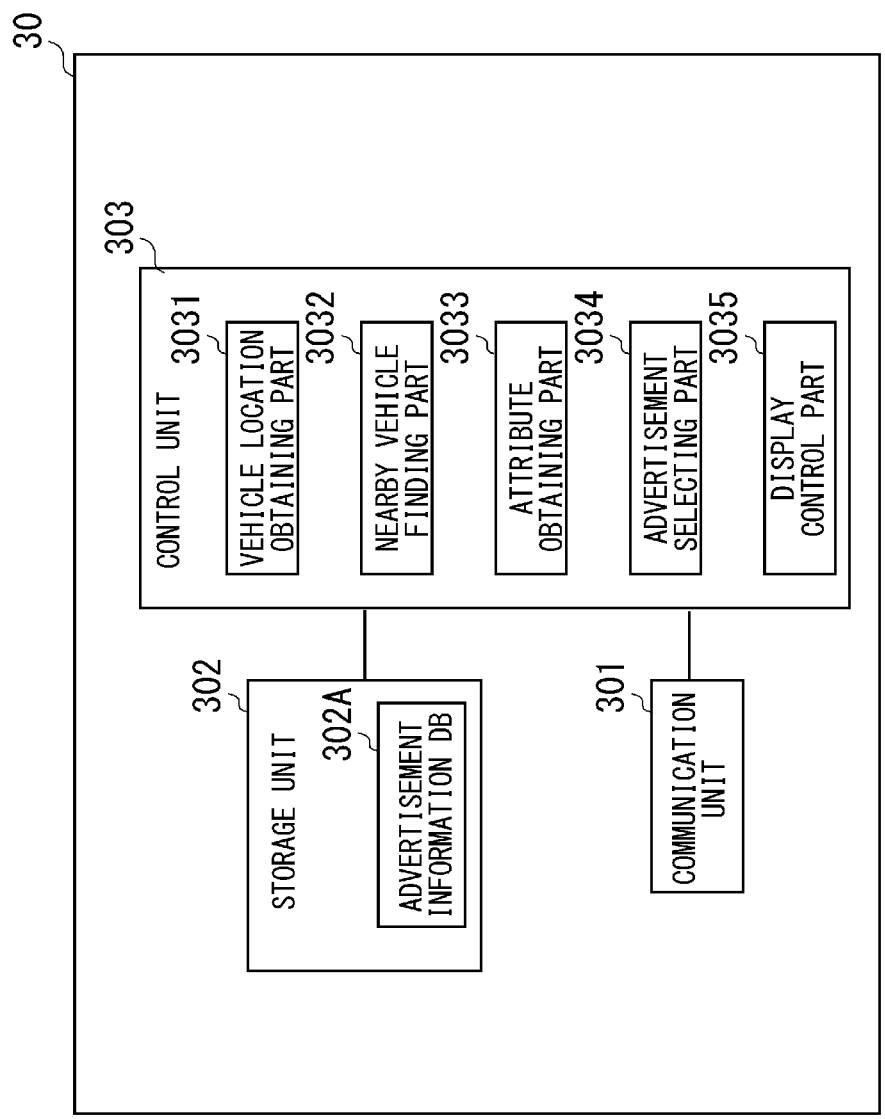
FIG. 5 is a diagram illustrating the system configuration of a server apparatus.

Next, the configuration of the server apparatus 30 will be described. FIG. 5 is a diagram illustrating the system configuration of the server apparatus 30. The server apparatus 30 has a communication unit 301, a storage unit 302, and a control unit 303.

The server apparatus 30 is constituted by a general-purpose information processing apparatus (or computer). The server apparatus 30 is a computer including a processor (s), such as a CPU and/or a GPU, a main storage device(s), such as a RAM and/or a ROM, and an auxiliary storage device(s), such as an EPROM, a hard disk drive and/or a removable medium. Examples of the removable medium include a USB memory and a recording disc medium, such as a CD or DVD. What is stored in the auxiliary storage device includes an operating system (OS), various programs, and various tables. The programs stored in the auxiliary storage device are loaded into a workspace of the main storage device and executed to control various components, thereby providing appropriate functions for achieving desired purposes, which will be described later. All or some of the functions may be implemented by a hardware circuit (s), such as an ASIC(s) or an FPGA(s). The server apparatus 30 may be constituted by a single computer or a plurality of computers that are configured to work in cooperation with each other.

The communication unit 301 is a communication interface that connects the server apparatus 30 to the communication line N. The communication unit 301 may include, for example, a network interface board and a wireless communication circuit for wireless communication.

The storage unit 302 includes a main storage device and an auxiliary storage device. The main storage device is a memory into which programs executed by the control unit 303 and data (including advertisement data) used by such control programs are loaded. The auxiliary storage device is a device in which the programs executed by the control unit 303 and the data used by the control programs (including advertisement data) are stored. The main storage device and the auxiliary storage device are similar to those in the above-described storage unit 103 of the advertisement displaying vehicle 10 and will not be described specifically.

The storage unit 302 stores an advertising information database 302A. The advertising information database 302A is created by managing data stored in the storage unit by a database management system program (DBMS program) executed by the processor. The database used in the apparatus according to the embodiment is, for example, a relational database.

Figure 6:
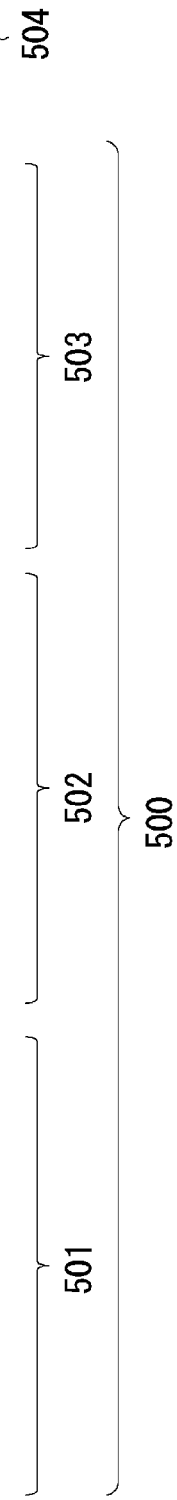
FIG. 6 illustrates an example of an advertising information table stored in an advertising information database.

Data stored in the advertising information database 302A will be described with reference to FIG. 6. FIG. 6 illustrates an exemplary structure of an advertising information table stored in the advertising information database 302A. As illustrated in FIG. 6, what is stored in the advertising information table includes identification data of the vehicle (vehicle ID), information relating to attributes of the advertisement (501), information relating to display of the advertisement (502), information designating occupants of advertisement target vehicles 20 (503), and data (or advertising information) to be output to the display apparatus 101 (504). The information designated by reference numerals 501 to 503 is used to select advertising information 504 to be displayed by the display apparatus 101 and will be also referred to as "advertisement selection information 500" hereinafter.

The advertising information 504 includes, for example, still image data, data of a series of images (or slide show), or moving image data.

The control unit 303 is a computing device that performs control processing of the server apparatus 30. The control unit 303 may be implemented by a computational processing unit, such as a CPU.

The control unit 303 includes, as functional modules, a vehicle location obtaining part 3031, a nearby vehicle finding part 3032, an attribute obtaining part 3033, an advertisement selection part 3034, and a display control part 3035. These functional modules may be implemented by executing programs stored in the auxiliary storage device by the CPU.

The vehicle location obtaining part 3031 obtains location information of the advertisement displaying vehicles 10 and the advertisement target vehicles 20. For example, the vehicle location obtaining part 3031 receives location information from each of the advertisement displaying vehicles 10 and the advertisement target vehicles 20 through the communication line N. In an alternative mode, each advertisement displaying vehicle 10 is configured to transmit a beacon signal (location information) using a short-range wireless communication technology, such as Bluetooth, and the vehicle location obtaining part 3031 receives the location information from advertisement target vehicles 20 that have received the beacon signal, through the communication line N.

The nearby vehicle finding part 3032 finds advertisement target vehicles 20 present in the vicinity of an advertisement displaying vehicle 10 based on the location information obtained by the vehicle location obtaining part 3031. For example, on the basis of the location information of the vehicles 10, 20, the nearby vehicle finding part 3032 identifies the advertisement target vehicles 20 that are located within a certain distance from the advertisement displaying vehicle 10 as vehicles present in the vicinity of the advertisement displaying vehicle 10. Alternatively, when the nearby vehicle finding part 3032 receives a beacon signal (location information) of the advertisement displaying vehicle 10 sent from an advertisement target vehicle 20, the nearby vehicle identification part 3032 identifies this advertisement target vehicle 20 that has sent the beacon signal as a vehicle present in the vicinity of the advertisement displaying vehicle 10.

The attribute obtaining part 3033 obtains attribute information, namely information about attributes of the occupants of display target vehicles 20. For example, the attribute obtaining part 3033 obtains attribute information of the occupants from each of the advertisement target vehicles 20 through the communication line N.

The advertisement selection part 3034 selects advertising information to be displayed by the display unit 101 of the advertisement displaying vehicle 10 on the basis of the attribute information obtained by the attribute obtaining part 3033. In other words, the advertisement selection part 3034 selects advertising information to be displayed by the display apparatus 101 on the basis of the attribute information of the occupants of the advertisement target vehicles 20 that are present in the vicinity of the advertisement displaying vehicle 10.

The display control part 3035 sends the advertising information selected by the advertisement selection part 3034 to the advertisement displaying vehicle and causes it to display the advertising information. The time to send the advertising information to the advertisement displaying vehicle 10 is not limited to the time at which the advertising information is to be displayed. For example, the advertisement selection part 3034 may send advertising information scheduled to be displayed to an advertisement displaying vehicle 10 beforehand to let the advertisement displaying vehicle 10 to store it in its storage unit. In this case, the display control part 3035 sends a control signal (or display command) for displaying the advertising information to the advertisement displaying vehicle 10 together with the advertisement ID of the advertising information selected by the advertisement selection part 3034 to cause the advertisement displaying vehicle 10 to display the advertising information designated by the advertisement ID.

Method of Displaying an Advertisement

Figure 7:
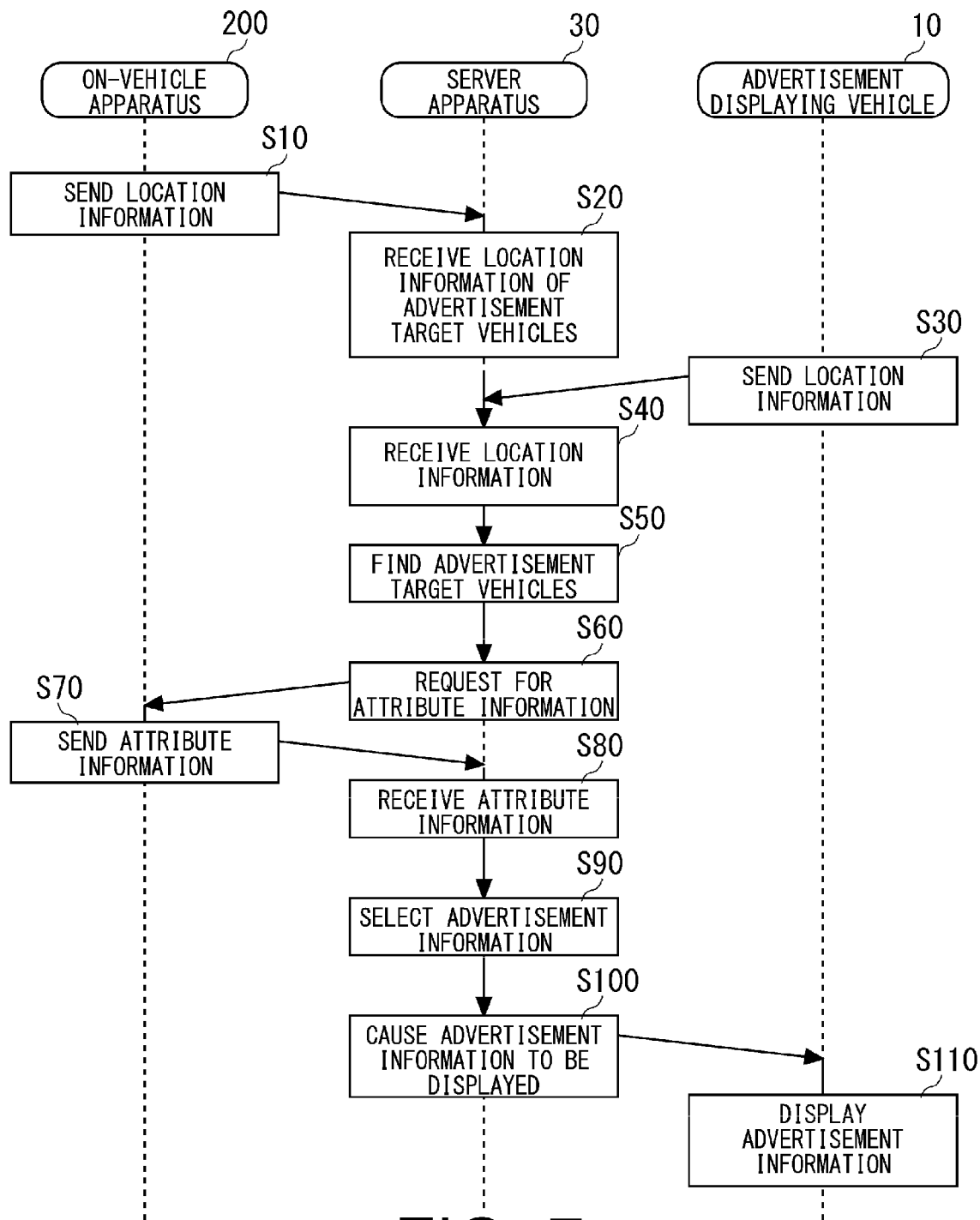
FIG. 7 is a diagram illustrating a process carried out by an advertisement displaying vehicle, on-vehicle apparatuses of advertisement target vehicles, and the server apparatus.

Next, the process of causing the advertisement displaying vehicle 10 to display advertising information carried out in the advertisement display system 100 according to this embodiment will be described. FIG. 7 is a diagram illustrating a process carried out by the on-vehicle apparatuses 200 of the advertisement target vehicles, the server apparatus 30, and each of the advertisement displaying vehicles 10. The process illustrated in FIG. 7 is performed for each of the advertisement displaying vehicles 10 that are under the management of the server apparatus 30 periodically (or every unit time).

In step S10, each of the on-vehicle apparatuses 200 send location information of the advertisement target vehicles 20 to the server apparatus 30. In step S20, the server apparatus 30 receives the location information from the on-vehicle apparatuses 200. In steps S10 and S20, each of the on-vehicle apparatuses 200 of the plurality of advertisement target vehicles 20 sends the location information, and the server apparatus 30 receives the location information from each of the on-vehicle apparatuses 200, though FIG. 7 illustrates steps S10 and S20 as a single process.

In step S30, the advertisement displaying vehicle 10 sends location information to the server apparatus 30. In step S40, the server apparatus 30 receives the location information from the advertisement displaying vehicle 10. In the case where advertisement target vehicles 20 receive a beacon from the advertisement displaying vehicle 10 and send it to the server apparatus 30 as location information, the steps S30 and S40 may be eliminated.

In step S50, the server apparatus 30 finds advertisement target vehicles 20 that are present in the vicinity of the advertisement displaying vehicle 10 on the basis of the location information obtained in steps S20 and S40. There may be cases where a plurality of advertisement target vehicles 20 are found as vehicles that are present in the vicinity of the advertisement displaying vehicle 10.

In step S60, the server apparatus 30 sends a request for attribute information of the occupants to the on-vehicle apparatuses 200 of the advertisement target vehicles 20 found in step S50. In response to this request, the relevant on-vehicle apparatuses 200 send the attribute information of the occupants acquired by the attribute information acquisition part 2021 to the server apparatus in step S70. In step S80, the server apparatus 30 receives the attribute information of the occupants from the on-vehicle apparatuses 200. If a plurality of advertisement target vehicles 20 are found in step S50, the processing of steps S60 to S80 is performed with the on-vehicle apparatuses 200 of all of the advertisement target vehicles 20 found in step S50, though FIG. 7 illustrates steps S60 to S80 as a single process.

In step S90, the server apparatus 30 consults the advertising information database 302A to select advertising information that matches the attribute information obtained in step S80. If there are a plurality of pieces of advertising information that match the attribute information, the server apparatus 30 may select those pieces of advertising information and prioritize them in accordance with the degree of matching. The degree of matching may be measured by, for example, the number of items in which the attribute information of the occupants and the advertisement selection information match each other or the number of occupants whom the advertisement selection information matches. A specific process of selecting advertising information will be described later.

In step S100, the server apparatus 30 performs the processing of causing the advertising information selected in step S90 to be displayed. For example, the server apparatus 30 sends the advertising information selected in step S90 to the advertisement displaying vehicle 10. After receiving the advertising information from the server apparatus 30, the advertisement displaying vehicle 10 displays it on the display apparatus 101, in step S110. In the case where the advertising information has been stored in the storage unit 103 of the advertisement displaying vehicle 10, the server apparatus sends the advertisement ID of the advertising information selected in step S90 and a display command to the advertisement displaying vehicle 10, in step S100. After receiving the advertisement ID and the display command, the advertisement displaying vehicle 10 retrieves the advertising information identified by the advertisement ID from the storage unit 103 and displays it on the display unit 101.

Figure 8:
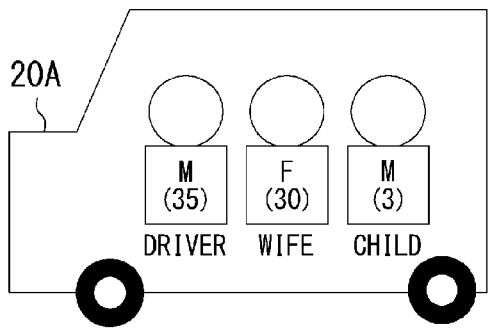
FIG. 8 illustrates an example of attribute information of the occupants of a plurality of advertisement target vehicles.
Figure 8:
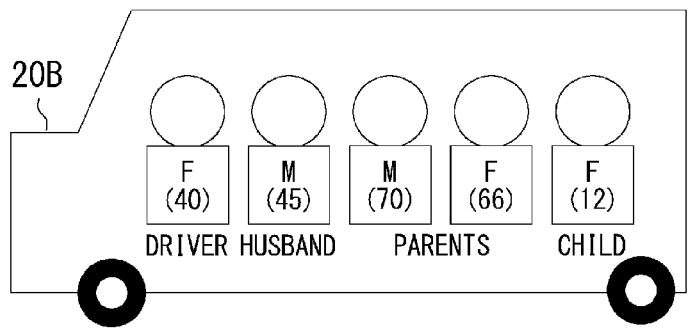
Figure 8:
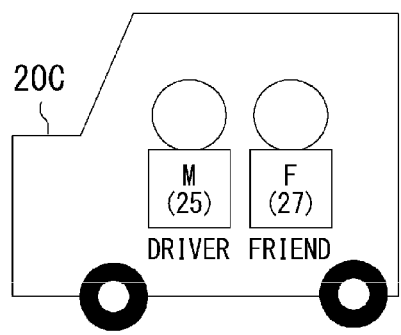
Figure 8:
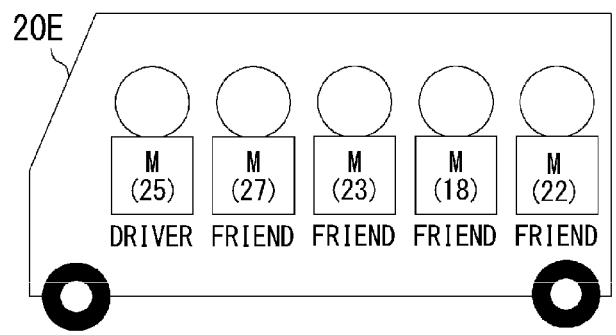
Figure 8:
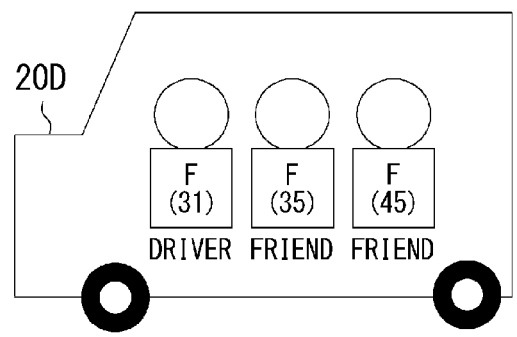
Figure 8:
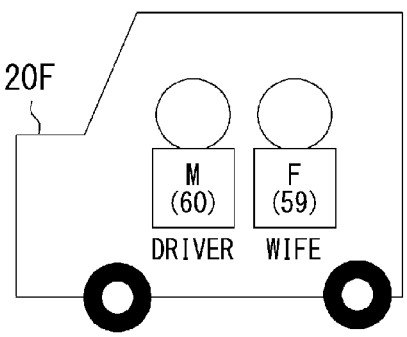

FIG. 8 illustrates an example of the occupants of a plurality of advertisement target vehicles and their attributes. For example, the occupants of advertisement target vehicle 20A are a male at age 35, a female at age 30, and a male at age 3. The on-vehicle apparatus 200 of the advertisement target vehicle 20A obtains attribute information of the occupants. Moreover, the on-vehicle apparatus 200 obtains the relationship between the driver and the other occupants as attribute information. In the case of the advertisement target vehicle 20A, the female at age 30 is the wife of the driver, and the male at age 3 is a son of the driver. In other words, the occupants of the advertisement target vehicle 20A are members of a family. The relationship is not limited to a family relationship. The relationship may be friend, colleague, customer etc.

The attribute information is entered by each occupant in the occupant's terminal 70, such as a smartphone, and stored in it. The occupant's terminal 70 sends the attribute information to the on-vehicle apparatus 200 of the advertisement target vehicle 20 when requested by the on-vehicle apparatus 200 of the advertisement target vehicle 20. Then, the on-vehicle apparatus 200 sends the attribute information to the server apparatus 30. The attribute information is not limited to information recorded in the occupant's terminal 70. In cases where attribute information of an occupant, such as age and gender, is recorded as user information in an information processing apparatus of a store or an on-line shopping site that the occupant uses, the information processing apparatus may send the attribute information to the server apparatus 30. For example, the occupant's terminal 70 may send the user ID to the on-vehicle apparatus 200, and then the on-vehicle apparatus 200 may send the user ID to the server apparatus 30. Then, the server apparatus 30 may obtain the user information identified by the user ID from the information processing apparatus of the store or the on-line shopping site as attribute information.

Attribute information of occupants who do not have an occupant's terminal 70 may be obtained by conjecture based on the attribute information of the occupants having an occupant's terminal 70. In the case of the advertisement target vehicle 20A in FIG. 8, the driver and his wife each have an occupant's terminal 70, while the son doesn't. Information about the driver's family including the wife and the son at age 3 is included in the stored attribute information. When an occupant who does not have an occupant's terminal 70 is detected from the result of sensing by the seat sensor or an image taken by the camera 207, the on-vehicle apparatus 200 conjectures that the detected occupant is the son of the driver and obtains the attribute information of the son from the attribute information of the driver. The server apparatus obtains attribute information (age, gender, and relationship) of the occupants of the other advertisement target vehicles 20B to 20F also in the same way as above.

The server apparatus 30 consults the advertising information database 302A to select advertising information that match the obtained attribute information. In the case shown in FIG. 6, the advertisement selection information 500 of the advertisement of the advertisement ID of A101 about a souvenir specifies the conditions about gender, age, and relation as "all", "above 45", and "family" respectively. The advertisement selection information 500 of the advertisement of the advertisement ID of A102 about a hot spring facility specifies the conditions about gender, age, and relation as "female", "above 40", and "all" respectively. The advertisement selection information 500 of the advertisements of the advertisement ID of A103 and A104 about a theme park and a spot of night view also specifies respective conditions as shown in FIG. 6.

If, for example, it is found in step S50 that the advertisement target vehicles 20A, 20B, and 20D are present in the vicinity of the advertisement displaying vehicle 10, the server apparatus 30 determines the number of occupants whose attribute information match the advertisement selection information 500 of each advertising information, in step S90. For example, in the case of the advertisement of the advertisement ID of A101 about a souvenir, the condition about gender is "all", which all the occupants (namely eleven occupants) meet. The condition about age is "above 45", which five occupants meet. The condition about relationship is "family", which eight occupants meet. Thus, the total number of occupants who match the advertisement of the advertisement ID of A101 about a souvenir is 24.

Likewise, the total number of occupants whose attribute information match the advertisement selection information 500 of the advertising information is 23 in the case of the advertisement of the advertisement ID of A102 about a hot spring facility, 20 in the case of the advertisement of the advertisement ID of A103 about a theme park, and 17 in the case of the advertisement of the advertisement ID of A104 about a spot of night view. Consequently, the advertising information about a souvenir with the largest number of matching occupants is selected to be displayed by the advertisement displaying vehicle 10. In the case where the displayed advertising information is changed at certain time intervals, the advertisements may be displayed in the order of larger number of matching occupants, namely in the order of souvenir, hot spring facility, theme park, and spot of night view.

In another exemplary case where it is determined in step S50 that the advertisement target vehicles 20B, 20D, and 20F are present in the vicinity of the advertisement displaying vehicle 10, the server apparatus 30 also determines the number of occupants whose attribute information match the advertisement selection information 500 of each advertising information. In this case, the total number of occupants whose attribute information match the advertisement selection information 500 of the advertising information is 23 in the case of the advertisement of the advertisement ID of A101 about a souvenir, 24 in the case of the advertisement of the advertisement ID of A102 about a hot spring facility, 18 in the case of the advertisement of the advertisement ID of A103 about a theme park, and 17 in the case of the advertisement of the advertisement ID of A104 about a spot of night view. Consequently, the advertising information about a hot spring facility with the largest number of matching occupants is selected to be displayed by the advertisement displaying vehicle 10.

In another exemplary case where it is determined that the advertisement target vehicles 20C, 20D, and 20E are present in the vicinity of the advertisement displaying vehicle 10, the advertising information about a theme park with the largest number of matching occupants is selected to be displayed by the advertisement displaying vehicle 10. In another exemplary case where it is determined that the advertisement target vehicles 20C, 20D, and 20F are present in the vicinity of the advertisement displaying vehicle 10, the advertising information about a spot of night view with the largest number of matching occupants is selected to be displayed by the advertisement displaying vehicle 10.

While in the above described illustrative case in FIG. 8, only age, gender, and relationship are used as attribute information for the sake of simplicity of description, the items of attribute information are not limited to them. The attribute information may include other items of information, such as hobby of the occupant, designated category, designated key word, and purchase history. In other words, the server apparatus 30 may select advertising information on the basis of not only age, gender, and relationship but also other items of information, such as hobbies of the occupants, categories designated by the occupants, key words designated by the occupants, and purchase histories of the occupants. The server apparatus 30 may select advertising information on the basis of information 502 relating to the condition for displaying the advertisement. For example, in the case of the advertisement of the advertisement ID of A101 about a souvenir, the display time is 9 to 13. Therefore, this advertisement is included in the list of potential choices in the selection in step S90 during this period of time and excluded from the list of potential choices outside this period of time. In the case of the advertisement of the advertisement ID of A102 about a hot spring facility, the display area is Kinki district. Therefore, this advertisement is included in the list of potential choices in the selection of step S90 when the advertisement displaying vehicle 10 is travelling in this area (Kinki district) and excluded from the list of potential choices when the advertisement displaying vehicle 10 is travelling outside this area.

As above, advertising information to be displayed is selected based on the attribute information of the occupants of a plurality of advertisement target vehicles present in the vicinity of the advertisement displaying vehicle 10. Therefore, it is possible to display appropriate advertising information that interests many occupants, leading to enhanced advertisement effectiveness.

Second Embodiment

In the second embodiment, advertising information is selected on the basis of the respective destinations of the advertisement target vehicles in addition to the attribute information of the occupants. The second embodiment is basically the same as the first embodiment except for the selection of advertising information based on the destinations. Therefore, the same components or processing steps will be denoted by the same reference signs to eliminate redundant descriptions.

Figure 9:
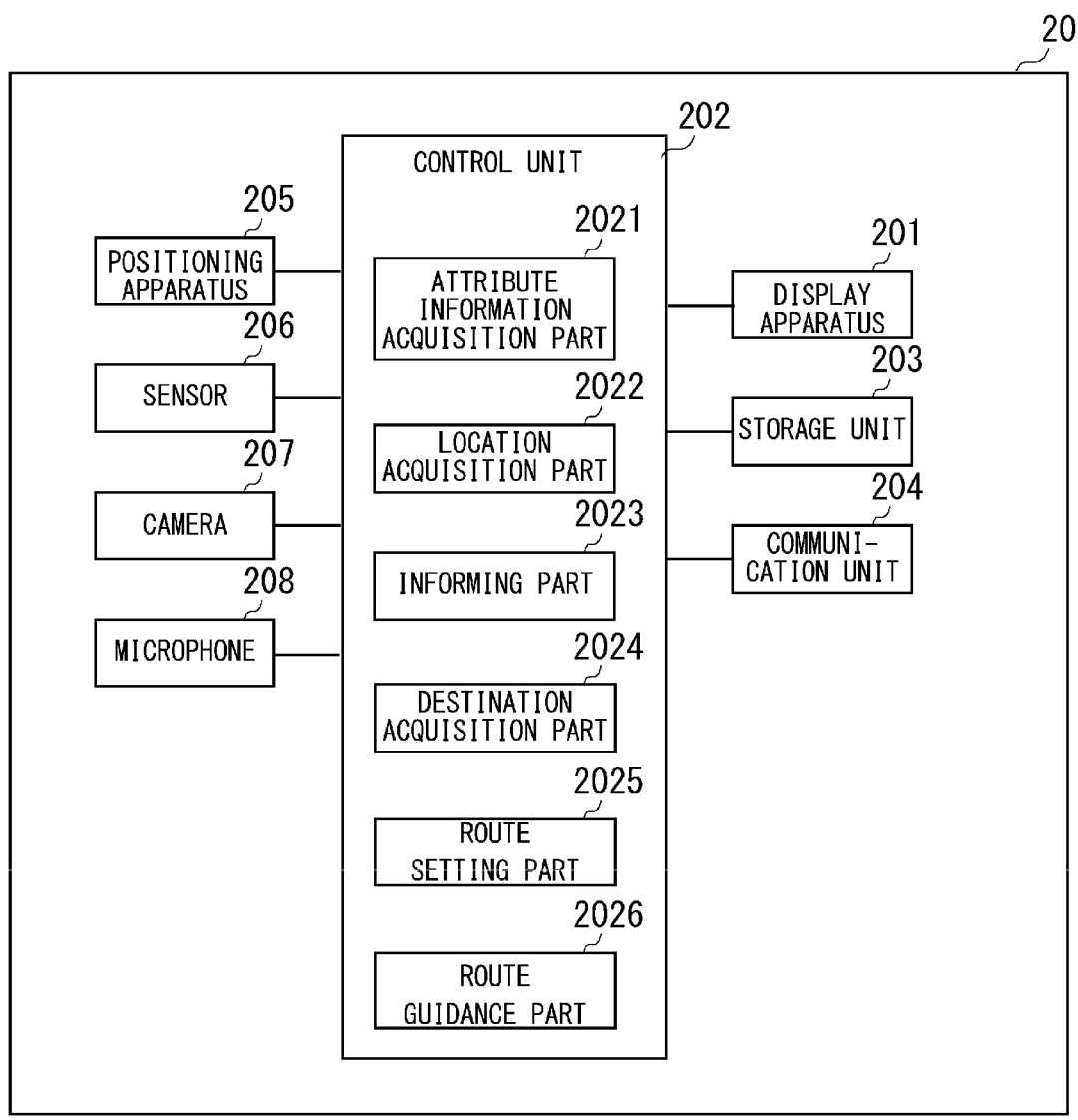
FIG. 9 is a diagram illustrating the configuration of an advertisement target vehicle according to a second embodiment.

FIG. 9 is a diagram illustrating the configuration of the advertisement target vehicle 20 according to the second embodiment. The on-vehicle apparatus 200 according to the second embodiment is what is called a navigation apparatus having the function of determining the location of the vehicle and capable of determining a route from the present location of the vehicle to a destination when the destination is set by the user and providing guidance along the route. The on-vehicle apparatus 200 may have other functions, such as an audio function and a drive recording function, in addition to the navigation function.

As illustrated in FIG. 9, the control unit 202 of the on-vehicle apparatus 200 according to the second embodiment has, as functional modules, a destination acquisition part 2024, a route setting part 2025, and a route guidance part 2026 in addition to the attribute information acquisition part 2021, the location acquisition part 2022, and the informing part 2023.

The destination acquisition part 2024 acquires the location of a destination entered by an operation by the user. For example, the user enters the address or name of the destination, and the application acquisition part 2024 acquires location information (e.g. latitude and longitude) of the place of the entered address or name using map information stored in the storage unit.

The route setting part 2025 finds routes from the present location to the destination acquired by the destination acquisition part 2024 and sets the shortest route as the optimum route.

The route guidance part 2026 causes the display unit to display the route set by the route setting part 2025 and provides route guidance for the driver by voice message etc.

The informing part 2023 sends to the server apparatus 30 information about the destination acquired by the destination acquisition part 2024 as well as the attribute information of the occupants and the location information.

After receiving the information about the destination, the advertisement selection part 3034 of the server apparatus 30 sorts the advertisement target vehicles 20 into groups according to their destinations and selects advertising information to be displayed for each of the groups on a group-by-group basis on the basis of the attribute information of the occupants of the vehicles in each group.

Figure 10:
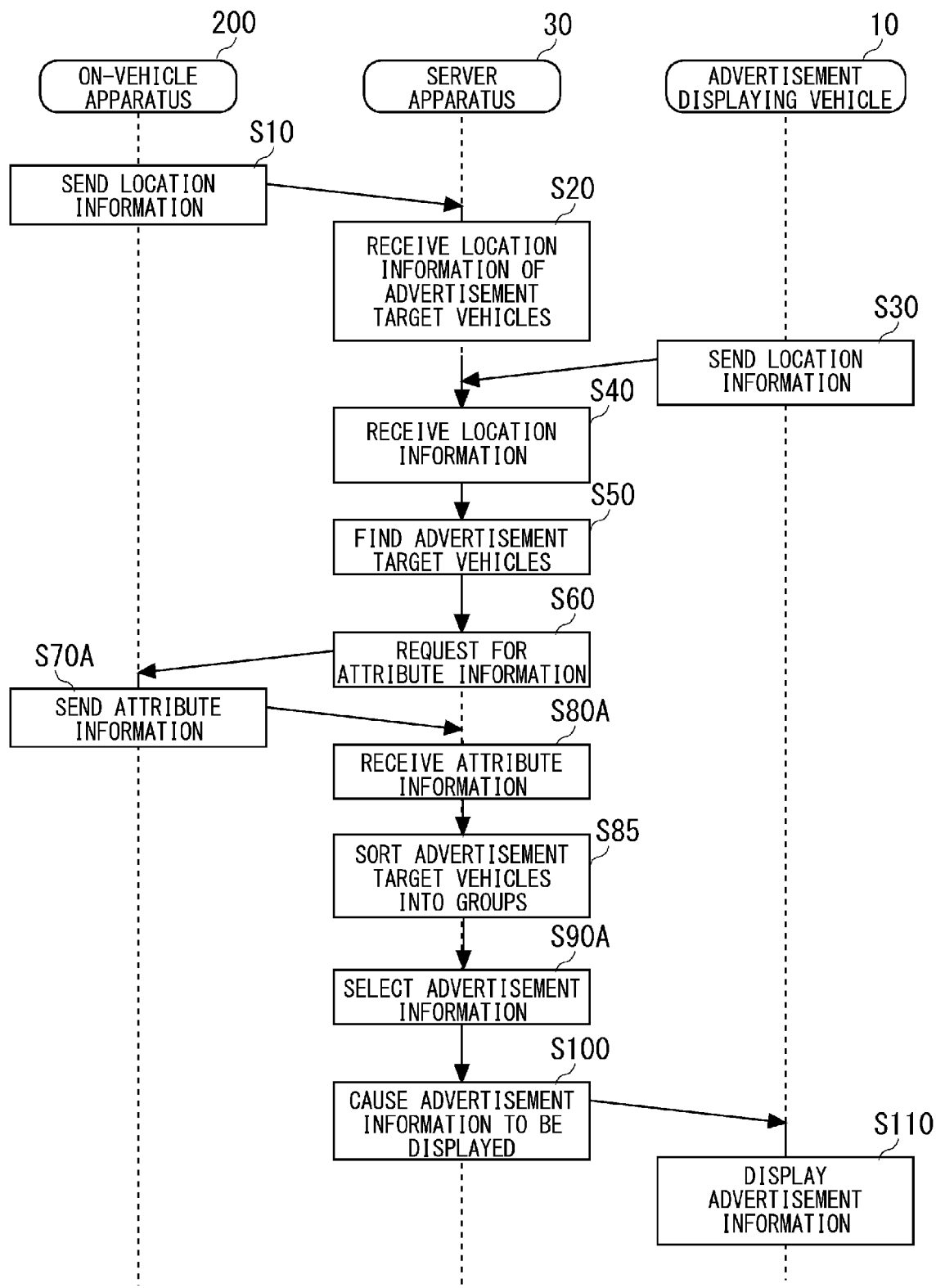
FIG. 10 is a diagram illustrating a process carried out by an advertisement displaying vehicle, on-vehicle apparatuses of advertisement target vehicles, and the server apparatus according to the second embodiment.

FIG. 10 is a diagram illustrating a process carried out by each of the advertisement displaying vehicles 10, the on-vehicle apparatuses 200 of the advertisement target vehicles 20, and the server apparatus 30. The processing of steps S10 to S60 is the same as that in the above-described process illustrated in FIG. 7 and will not be described further.

In step S70A, each of the on-vehicle apparatuses 200 sends the location information of the destination acquired by the destination acquisition part 2024 as well as the attribute information of the occupants acquired by the attribute information acquisition part 2021 to the server apparatus 30. In step S80A, the server apparatus 30 receives the attribute information of the occupants and the location information of the destination from the on-vehicle apparatuses 200.

In step S85, the server apparatus 30 sorts the plurality of advertisement target vehicles into groups according to their destinations. For example, advertisement target vehicles 20 whose destinations are close to each other are put into the same group. In this connection, the destinations may be regarded to be close to each other when distances between them are smaller than a predetermined distance (e.g. 20 km) or when they are located in the same area (e.g. in the same city, town, village, or regional mesh).

In step S90A, the server apparatus 30 selects advertising information that matches the attribute information of the occupants of the advertisement target vehicles 20 in the same group, for each of the groups.

The server apparatus 30 puts the vehicles 20A to 20C into a group and the vehicles 20D to 20F into another group.

For example, let us consider a case where there are advertisement target vehicles 20A to 20F in the vicinity of the advertisement displaying vehicle 10, the destination of the vehicles 20A to 20C is Nagoya, and the destination of the vehicles 20D to 20F is Kyoto. Then, the server apparatus 30 selects advertising information for the former group based on the attribute information of the occupants of the advertisement target vehicles 20A to 20C and further selects advertising information for the latter group based on the attribute information of the occupants of the advertisement target vehicles 20D to 20F.

When the advertisement target vehicles 20 are sorted into a plurality of groups, advertising information to be displayed is selected for each of the groups on a group-by-group basis. Then, the advertising information to be selected may be one having the highest degree of matching (e.g. the largest number of matching occupants), or a plurality of pieces of advertising information may be selected with prioritization according to the degree of matching. When a plurality of pieces of advertising information are selected, the advertising information selected for the group that leaves the route of travel of the advertisement displaying vehicle 10 earlier (e.g. a group of vehicles whose destination is Nagoya) may be displayed earlier, and the advertising information selected for the group that leaves the route of travel of the advertisement displaying vehicle 10 later (e.g. a group of vehicles whose destination is Kyoto) may be displayed later.

The destinations of the advertisement object vehicles 20 may be used not only in grouping the advertisement object vehicles 20 but also as attribute information of the occupants in selecting advertisement information. Thus, the destination can be taken into consideration when selecting an advertisement. For example, an advertisement about a souvenir may be selected for the group whose destination is Nagoya, and an advertisement about a kimono may be selected for the group whose destination is Kyoto. The processing of steps S100 to S110 is the same as that in the above-described process illustrated in FIG. 7.

As above, according to the second embodiment, the advertisement target vehicles are narrowed down according to their destinations. Therefore, it is possible to display advertising information more suitable for the occupants of the advertisement target vehicles, thereby enhancing the advertising effectiveness.

Modification

In a modification, advertisement target vehicles 20 present in the vicinity of an advertisement displaying vehicle 10 are found using location information of the advertisement target vehicles 20, their destinations, and their speed. This modification is basically the same as the second embodiment except for the selection of advertising information based on the destinations and the speed. Therefore, the same components or processing will be denoted by the same reference signs to eliminate redundant descriptions.

Figure 11:
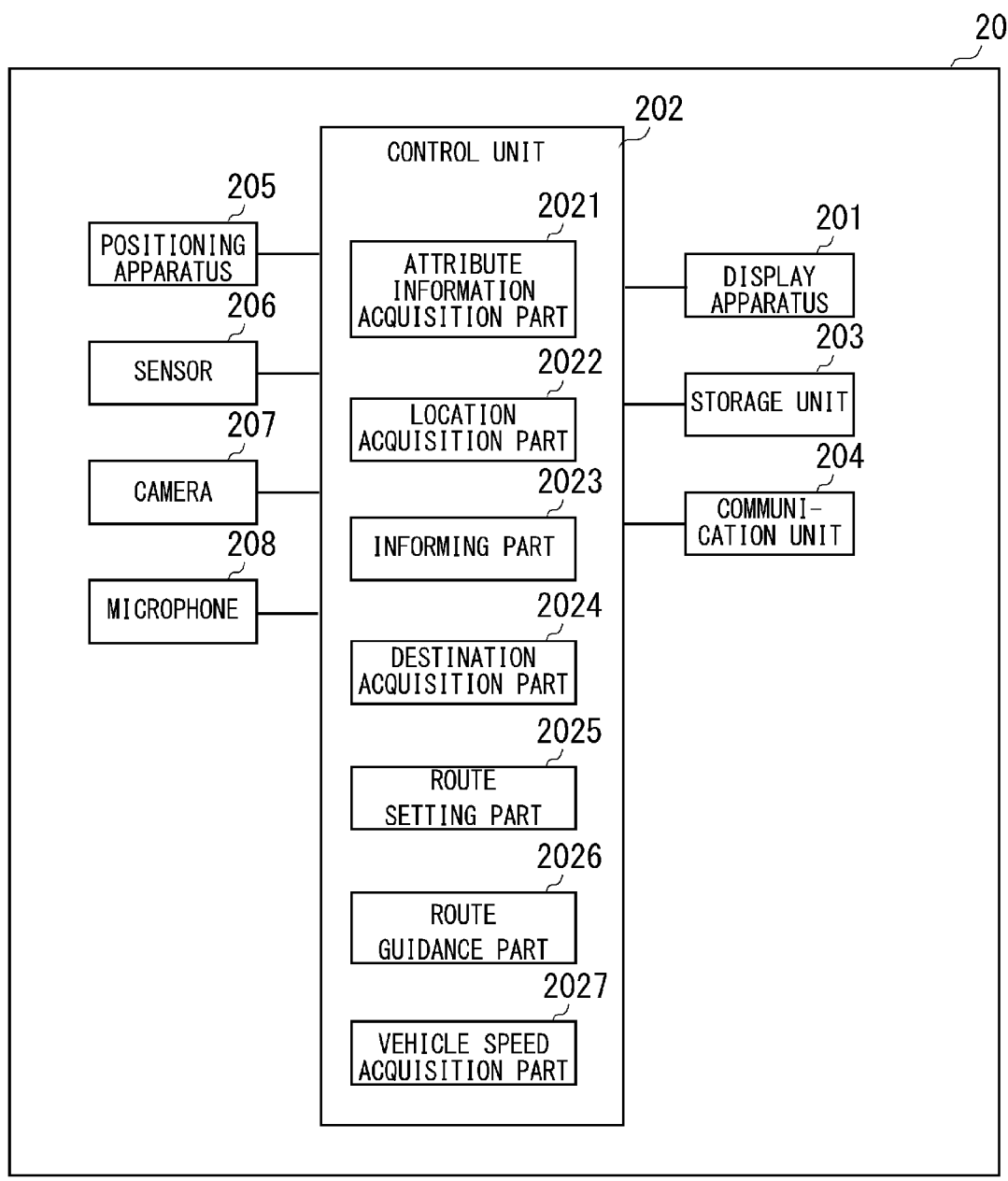
FIG. 11 is a diagram illustrating the configuration of an advertisement target vehicle according to a modification.

FIG. 11 is a diagram illustrating the configuration of the advertisement target vehicle 20 according to the modification. As illustrated in FIG. 11, the control unit 202 according to the modification has a vehicle speed acquisition part 2027 as a functional module in addition to the functional modules shown in FIG. 9.

The vehicle speed acquiring part 2027 acquires the speed of the advertisement target vehicle 20 through the sensor 206. The informing part 2023 sends information about the destination acquired by the destination acquisition part 2024 and information about the vehicle speed acquired by the vehicle speed acquisition part 2027 as well as the location information to the server apparatus 30.

The nearby vehicle finding part 3032 of the server apparatus 30 receives the location information, information about the destination, and information about the vehicle speed from the advertisement target vehicles 20 and find advertisement target vehicles 20 that will be present in the vicinity of an advertisement displaying vehicle 10 during a period over which advertising information is scheduled to be displayed (which will also be referred to as "scheduled display period" hereinafter) on the basis of the received information. Specifically, for example, the nearby vehicle finding part 3032 determines the route of each advertisement target vehicle 20 from the location information and the destination of the advertisement target vehicle 20 and conjectures the locations of the advertisement target vehicle 20 during the scheduled display period over which advertising information to be selected next will be displayed from the speed of the advertisement target vehicle 20. Then, if the route of travel of an advertisement target vehicle 20 is the same as that of the advertisement displaying vehicle 10 and the conjectured locations of the advertisement target vehicle 20 during the schedule display period fall in the vicinity of the advertisement displaying vehicle 10, the nearby vehicle finding part 3032 identifies this advertisement target vehicle 20 as a vehicle present in the vicinity of the advertisement displaying vehicle 10. Even if an advertisement target vehicle 20 is present in the vicinity of the advertisement displaying vehicle 10 at the time when the server apparatus 30 find it, there may be cases where the advertisement target vehicle 20 will be separated from the advertisement displaying vehicle 10 in the future period during which advertising information is scheduled to be displayed actually due to differences in their speeds and travel routes. To prevent such situations from occurring, the nearby vehicle finding part 3032 according to this modification is configured to conjecture advertisement target vehicles 20 that will be present in the vicinity of the advertisement displaying vehicle 10 during a period over which advertising information to be selected next is scheduled to be displayed from the route of travel and speed of each advertisement target vehicle 20. The nearby vehicle finding part 3032 obtains the travel route of the advertisement displaying vehicle 10 in advance and determines the speed of the advertisement displaying vehicle 10 from the locations of the travelling advertisement displaying vehicle 10 that are obtained periodically to determine its locations during the display period.

Figure 12:
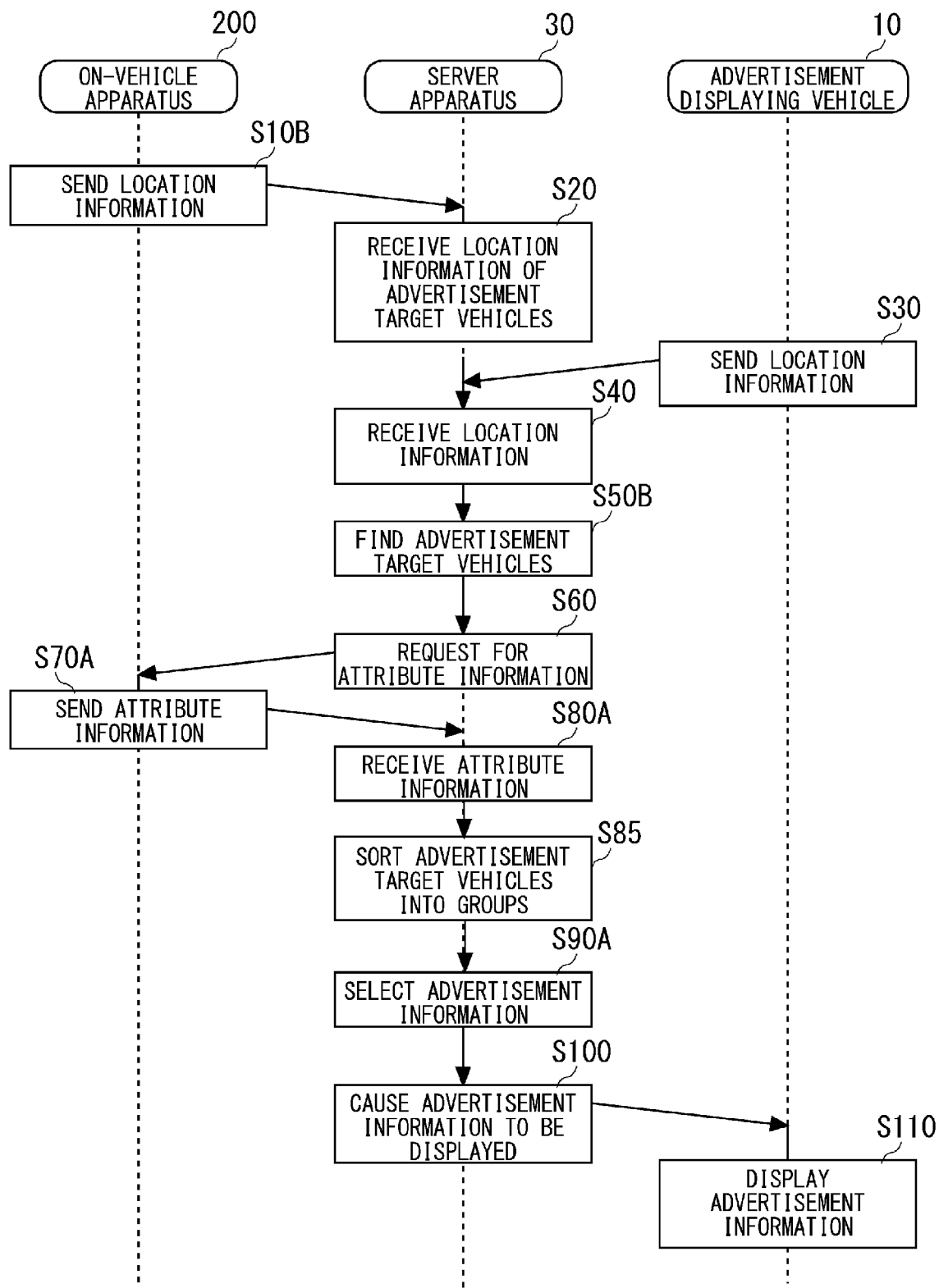
FIG. 12 is a diagram illustrating a process carried out by an advertisement displaying vehicle, on-vehicle apparatuses of advertisement target vehicles, and the server apparatus according to the modification.

FIG. 12 is a diagram illustrating a process carried out by the advertisement displaying vehicle 10, the on-vehicle apparatuses 200 of the advertisement target vehicles 20, and the server apparatus 30.

In step S10B, the on-vehicle apparatuses 200 send location information and the respective destinations and speeds of the advertisement target vehicles 20 to the server apparatus 30. In step S20, the server apparatus 30 receives location information from the advertisement target vehicles 200.

In step S30, the advertisement displaying vehicle 10 sends its location information to the server apparatus 30. In step S40, the server apparatus 30 receives the location information from the advertisement displaying vehicle 10. In step S30, the advertisement displaying vehicle 10 may send information about its speed and destination with its location information to reduce the processing load of the server apparatus 30.

In step S50B, the server apparatus 30 conjectures the location of each of the advertisement target vehicles 20 during the scheduled display period from the location information and information about the vehicle speed and destination obtained in step S20. The server apparatus 30 executes the process according to FIG. 12 repeatedly, and therefore the server apparatus 30 obtains the location information of the advertisement displaying vehicle 10 in step S40 periodically. The server apparatus holds the route of travel of the advertisement displaying vehicle 10 stored in it in advance. The server apparatus 30 determines the speed of each of the advertisement displaying vehicles 10 from the repeatedly-obtained location information and the route of travel and conjectures the locations of each of the advertisement displaying vehicles 10 during the scheduled display period from the speed and the route of travel. Then, the server apparatus 30 find advertisement target vehicles 20 that will be present in the vicinity of the conjectured locations of the advertisement displaying vehicle 10 during the scheduled display period.

The processing of steps S60 to S80 is the same as that in the above-described process illustrated in FIG. 7, and the processing of steps S85 to S110 is the same as that in the above-described process illustrated in FIG. 10. In other words, the server apparatus 30 sorts the advertisement target vehicles 20 into groups and selects advertising information for each of the groups on a group-by-group basis to let the selected advertising information be displayed.

As above, the server apparatus 30 according to this modification conjectures the location of each advertisement target vehicle 20 from its destination and speed and finds advertisement target vehicles 20 that will be present in the vicinity of the advertisement displaying vehicle 10 during the scheduled display period. This prevents the advertisement target vehicles 20 thus found from being separated from the vicinity of the advertisement displaying vehicle 10 during the scheduled display period, leading to enhanced advertising effectiveness.

While we described that the processing of steps S85 to S110 after step S80 is the same as that in FIG. 10, the processing same as that in steps S90 to S110 in FIG. 7 in the first embodiment may be executed instead.

(Other Modifications)

The processing and means that have been described in the foregoing may be employed in any combination so long as it is technically feasible to do so.

For example, while in the above-described embodiments and modification the processing of selecting advertising information is executed by the server apparatus 30, it may be executed by the control unit 102 of the advertisement displaying vehicle 10. Specifically, the control unit 102 may obtain necessary information such as advertising information and attribute information of the occupants through the server apparatus 30 and select and display advertising information. All the above-described processing executed by the server apparatus 30 may be executed by the control unit 102, and the control unit 102 may obtain necessary information such as location information and attribute information from the advertisement target vehicles 20 and select and display advertising information.

The present disclosure can be carried out by supplying a computer program(s) that implements the functions described in the above description of the embodiment to a computer to let one or more processors of the computer read and execute the program(s). Such a computer program(s) may be supplied to the computer by a computer-readable, non-transitory storage medium that can be connected to a system bus of the computer, or through a network. Examples of the computer-readable, non-transitory storage medium include any type of disc medium including, a magnetic disc, such as a floppy (registered trademark) disc and a hard disk drive (HDD), and an optical disc, such as a CD-ROM, a DVD disc and a Blu-ray disc, a read-only memory (ROM), a random access memory (RAM), an EPROM, an EEPROM, a magnetic card, a flash memory, an optical card, and any type of medium suitable for storage of electronic commands.

What is claimed is:

1. An information processing apparatus comprising:
a processor programmed to:
obtain location information of an advertisement displaying vehicle capable of displaying advertising information on a display apparatus arranged to face outside;
find a plurality of advertisement target vehicles present in the vicinity of the advertisement displaying vehicle based on the location information;
obtain attribute information indicating attributes of a plurality of occupants of the plurality of advertisement target vehicles, wherein the attribute information is obtained from at least one occupant terminal of at least one of the occupants that stores the attribute information;
select advertising information to be displayed by the display apparatus on the basis of the attribute information, the advertising information being selected from among a plurality of advertisements based on a degree of matching between (i) the attribute information of the plurality of occupants and (ii) predetermined conditions for each of the advertisements; and
cause the display apparatus to display the selected advertising information to the plurality of occupants, wherein
the processor is further programmed to determine a number of occupants using data from an image sensor, and detect an occupant that does not have an occupant terminal based on the data from the image sensor and the determined number of occupants, and
the attribute information of the occupant that does not have the occupant terminal is obtained based on the attribute information stored in the at least one occupant terminal of the at least one of the occupants in a same one of the plurality of advertisement target vehicles.

2. The information processing apparatus according to claim 1, wherein the processor is further programmed to:
obtain the respective destinations of the plurality of advertisement target vehicles;
sort the plurality of advertisement target vehicles into groups based on the destinations; and
select an advertisement to be displayed by the display apparatus for each group based on the attribute information of occupants of the vehicles in the group.

3. The information processing apparatus according to claim 1, wherein the processor is further programmed to:
obtain the respective destinations of the plurality of advertisement target vehicles;
obtain the respective vehicle speeds of the plurality of advertisement target vehicles; and
find a plurality of advertisement target vehicles that will be present in the vicinity of the advertisement displaying vehicle during a period over which the advertising information is scheduled to be displayed on the basis of the location information, the destinations, and the vehicle speeds.

4. An information processing method comprising executing the following processing by an information processing apparatus:
obtaining location information of an advertisement displaying vehicle capable of providing an advertisement through a display apparatus arranged to face outside;
finding a plurality of advertisement target vehicles present in the vicinity of the advertisement displaying vehicle based on the location information;
obtaining attribute information indicating attributes of a plurality of occupants of the plurality of advertisement target vehicles, wherein the attribute information is obtained from at least one occupant terminal of at least one of the occupants that stores the attribute information;
selecting advertising information to be displayed by the display apparatus on the basis of the attribute information, the advertising information being selected from among a plurality of advertisements based on a degree of matching between (i) the attribute information of the plurality of occupants and (ii) predetermined conditions for each of the advertisements; and
causing the display apparatus to display the selected advertising information to the plurality of occupants, wherein
a number of occupants is determined using data from an image sensor, and an occupant that does not have an occupant terminal is detected based on the data from the image sensor and the determined number of occupants, and
the attribute information of the occupant that does not have the occupant terminal is obtained based on the attribute information stored in the at least one occupant terminal of the at least one of the occupants in a same one of the plurality of advertisement target vehicles.

5. A non-transitory computer readable storing medium recording a computer program for causing an information processing apparatus to execute the processing of:

obtaining location information of an advertisement displaying vehicle capable of providing an advertisement through a display apparatus arranged to face outside;

finding a plurality of advertisement target vehicles present in the vicinity of the advertisement displaying vehicle based on the location information;

obtaining attribute information indicating attributes of a plurality of occupants of the plurality of advertisement target vehicles, wherein the attribute information is obtained from at least one occupant terminal of at least one of the occupants that stores the attribute information;

selecting advertising information to be displayed by the display apparatus on the basis of the attribute information, the advertising information being selected from among a plurality of advertisements based on a degree of matching between (i) the attribute information of the plurality of occupants and (ii) predetermined conditions for each of the advertisements; and causing the display apparatus to display the selected advertising information to the plurality of occupants, wherein a number of occupants is determined using data from an image sensor, and an occupant that does not have an occupant terminal is detected based on the data from the image sensor and the determined number of occupants, and the attribute information of the occupant that does not have the occupant terminal is obtained based on the attribute information stored in the at least one occupant terminal of the at least one of the occupants in a same one of the plurality of advertisement target vehicles.

\* \* \* \* \*